United States Patent [19]

Herrick

[11] Patent Number: 5,512,908
[45] Date of Patent: Apr. 30, 1996

[54] APPARATUS AND METHOD FOR LOCATING CELLULAR TELEPHONES

[75] Inventor: David L. Herrick, Mont Vernon, N.H.

[73] Assignee: Lockheed Sanders, Inc., Nashua, N.H.

[21] Appl. No.: 272,725

[22] Filed: Jul. 8, 1994

[51] Int. Cl.⁶ .............................. G01S 1/24; H04M 11/00
[52] U.S. Cl. ............................ 342/387; 342/451; 379/59
[58] Field of Search ................................. 342/387, 451; 379/59

[56] References Cited

U.S. PATENT DOCUMENTS

| | | | |
|---|---|---|---|
| 4,433,335 | 2/1984 | Wind | 342/463 |
| 5,317,323 | 5/1994 | Kennedy et al. | 342/457 |
| 5,327,144 | 7/1994 | Stilp et al. | 342/387 |

Primary Examiner—Gregory C. Issing
Attorney, Agent, or Firm—David W. Gomes

[57] ABSTRACT

A method for determining the time difference of arrival, tdoa, of signals from a cellular telephone, includes determining tdoas for a plurality of channels, averaging the tdoas from the channels, subtracting the average tdoa from the individual channel tdoas to determine residual channel tdoas and determining an overall residual tdoa from the residual channel tdoas. An apparatus and method for collecting cell phone transmission signals for performing tdoa calculations, includes receiving, digitizing and temporarily storing wideband transmission signals while monitoring a known reverse control channel for a predetermined cell phone number to be located, and permanently storing the delayed reverse control channel signal once the predetermined number is identified.

17 Claims, 4 Drawing Sheets

RECONSTRUCTED WIDEBAND TIME DOMAIN PLOT OF MULTIPLE ARRIVALS
16 FREQUENCIES UNIFORMLY SPACED OVER A 1 MHz BAND

APPARATUS AND METHOD FOR LOCATING CELLULAR TELEPHONES

BACKGROUND OF THE INVENTION

1. Field of the Invention

The present invention generally relates to the function of locating cellular telephones and particularly, to a method and apparatus which take advantage of the multiple channels used by a cellular telephones for this purpose.

2. Statement of the Prior Art

The proliferation of cellular telephones, or cell phones, and their technology and usage, has revealed various applications for the ability to locate cell phones. These applications include "911" calls, tourist and travel information, tracking of unauthorized cell phone usage and illegal activities and the locating of commercial and government vehicles, to name a few. The basic cell phone systems can only determine the nearest cell phone base station which locates the cell phone to within 3 to 10 miles.

A great deal of technology also exists concerning the tracking or locating of radio transmitters. A goal of any such system for use with cellular phones is the use of as much existing equipment as possible or at least compatibility with existing equipment. Examples of this are use with unmodified cellular phones and compatibility with existing cellular base stations.

One known method for locating transmitters is time difference of arrival, tdoa, which has been used for many years, at least in such applications as LORAN and GPS. The application of this process to cell phones includes measuring the time of arrival of the same signal at a multiplicity of locations and comparing the times to determine how long the signal took to reach each receiver. Because it operates on the ordinary signal transmitted, it does not require any modifications of the transmitter. One such application of tdoa technology combined with direction finding and applied to cellular phones is described in U.S. Pat. No. 5,317,323. The system described therein uses GPS timing signals at the receivers to determine the time of signal reception and generally concerns the use of direction finding to help eliminate multipath and co-channel interference. Unfortunately, the use of direction finding requires the use of a steerable antenna array and is thus not compatible with existing omnidirectional antenna structures. The patent does show the importance of removing multipath interference. For this reason, it is a goal of any such locating system for cellular telephones to distinguish between a direct signal from a cell phone and multipath reflections of the same signal from buildings and other reflectors. Reflected signals, which take a longer and unknown path to the receiver, provide less accurate location information.

SUMMARY OF THE INVENTION

Accordingly, it is a object of the present invention to provide an apparatus and method for determining the location of cellular telephones by using time difference of arrival measurements at a multiplicity of cell phone base stations.

It is a further object of the present invention to perform such location finding even when the signals received at one or more of the base stations are indistinguishable from noise and other co-channel interference.

It is still a further object of the present invention to perform such location finding in the presence of high levels of multipath reflected signals.

It is yet a further object of the present invention to perform such location finding while taking advantage of the frequency separation of a plurality of cell phone channels to improve the accuracy of the location finding.

It is yet a further object of the present invention to perform such location finding using antennas and antenna structures which are normally used for typical cell phone operation.

In one form, the present invention provides a method for determining the time difference of arrival, tdoa, of signals from a cellular telephone, cell phone, at a pair of base stations, comprising the steps of: substantially simultaneously sampling transmission signals from the cell phone at the pair of base stations in a plurality of cell phone channels having different frequencies; correlating the corresponding signals sampled at the base stations for each channel to determine a tdoa therebetween for each channel; averaging the tdoas determined for each channel; subtracting the average tdoa from each of the determined channel tdoas to determine a residual phase tdoa for each channel; determining an overall phase tdoa between the pair of base stations based upon the residual phase tdoas for each channel; and adding the average tdoa to the overall phase tdoa to determine an overall tdoa between the pair of base stations.

In another form, the present invention provides a method for collecting transmission signals at a first cell phone base station from a particular cell phone for the purpose of determining location of the cell phone using time difference of arrival, tdoa, comprising the steps of: receiving signals transmitted over all channels of a wideband, cell phone base station, operating spectrum including a known reverse control channel thereof; digitizing the received wideband spectrum signals; storing the digitized signals as digitized data in a delay memory; monitoring the known reverse control channel signal for a cell phone transmission including a predetermined phone number of a cell phone to be located; identifying a predetermined number from the monitoring of the reverse control channel; and storing data from the delay memory in response to the identifying of the predetermined number, including the portion of the received signal bearing the identifying data of the predetermined number.

In yet another form, the present invention provides an apparatus for collecting transmission signals at a first cell phone base station from a particular cell phone for the purpose of determining location of the cell phone using time difference of arrival, tdoa, comprising: means for receiving signals transmitted over all channels of a wideband, cell phone base station, operating spectrum including a known reverse control channel thereof; means for digitizing the received wideband spectrum signals; means for storing the digitized signals as digitized data in a delay memory; means for monitoring the known reverse control channel signal for a cell phone transmission including a predetermined phone number of a cell phone to be located; means for identifying a predetermined number from the monitoring of the reverse control channel; and means for storing data from the delay memory in response to the identifying of the predetermined number, including the portion of the received signal bearing the identifying data of the predetermined number.

BRIEF DESCRIPTION OF THE DRAWINGS

The present invention is illustratively described in reference to the appended drawings in which.

DETAILED DESCRIPTION OF THE DRAWINGS

Figure 1:
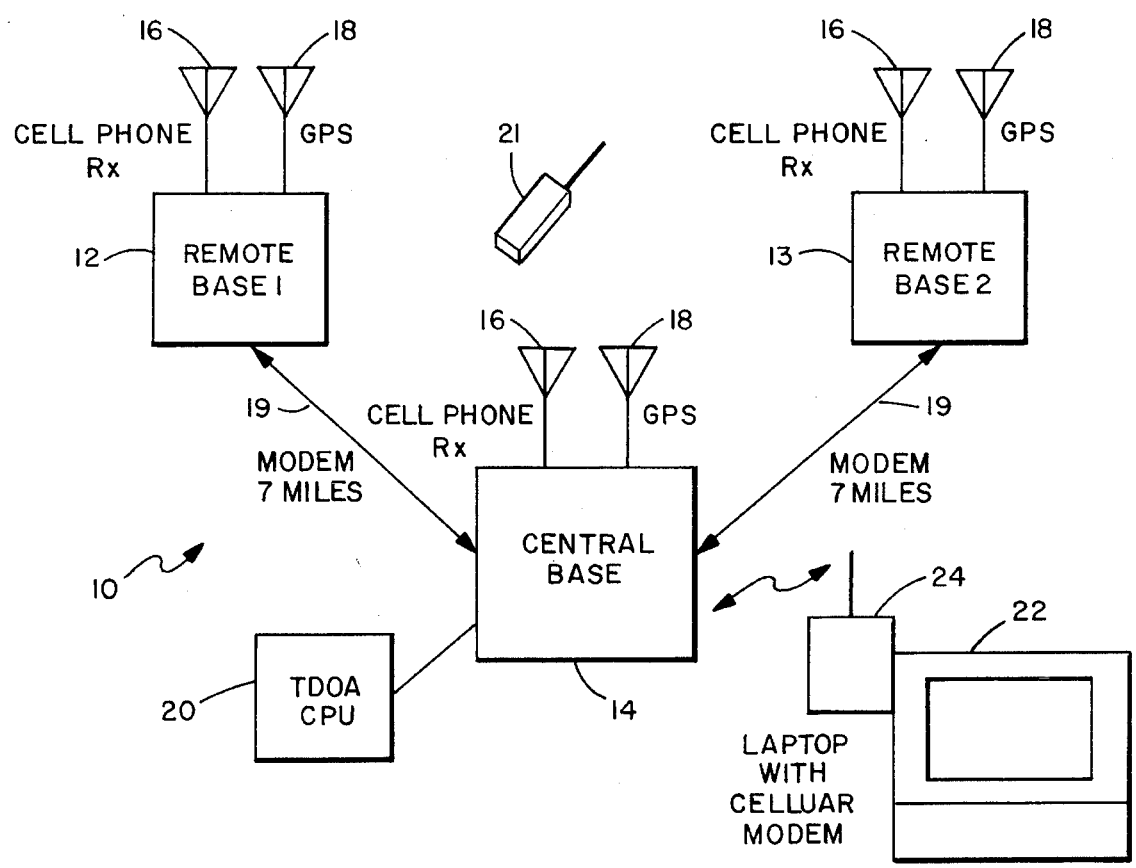
FIG. 1 is a system block diagram of an apparatus constructed in accordance with one embodiment of the present invention.

FIG. 1 shows one embodiment of a cell phone locating system 10 which would take advantage of existing cell phone base stations and antennas. System 10 generally includes a multiplicity of existing cell base stations 12–14, to which the apparatus of the present invention is added. Base stations 12–14 make use of existing transmit and receive antennas 16 which may be identical in form and function. Added to each base station is an additional GPS (Global Positioning System) antenna 18 which receives signals from the existing civilian GPS for use in the locating function. Each of the base stations also includes further equipment for performing the locating function as described below. Communication lines 19 are shown connecting at least two remote base stations 12,13 with a central base station 14. Central base station 14 includes equipment not present in the remote base stations 12,13 in the form of tdoa CPU 20 for processing signals received by all base stations 12–14. Tdoa CPU 20 may be located at any one of the base stations or may be located separately from such base stations. Such separate location would include the interconnection of all comm. lines 19 directly between the base stations and tdoa CPU 20. A cell phone 21, located within the range of the base stations 12–14, may be located by the equipment of the present embodiment.

The base station 14, having tdoa CPU 20, is shown being accessed by a computer 22, such as a portable computer, using a telecommunications link, such as a cellular telephone modem 24, for the purpose of requesting location information or the performance of a locating operation on a cell phone such as 21.

Figure 2:
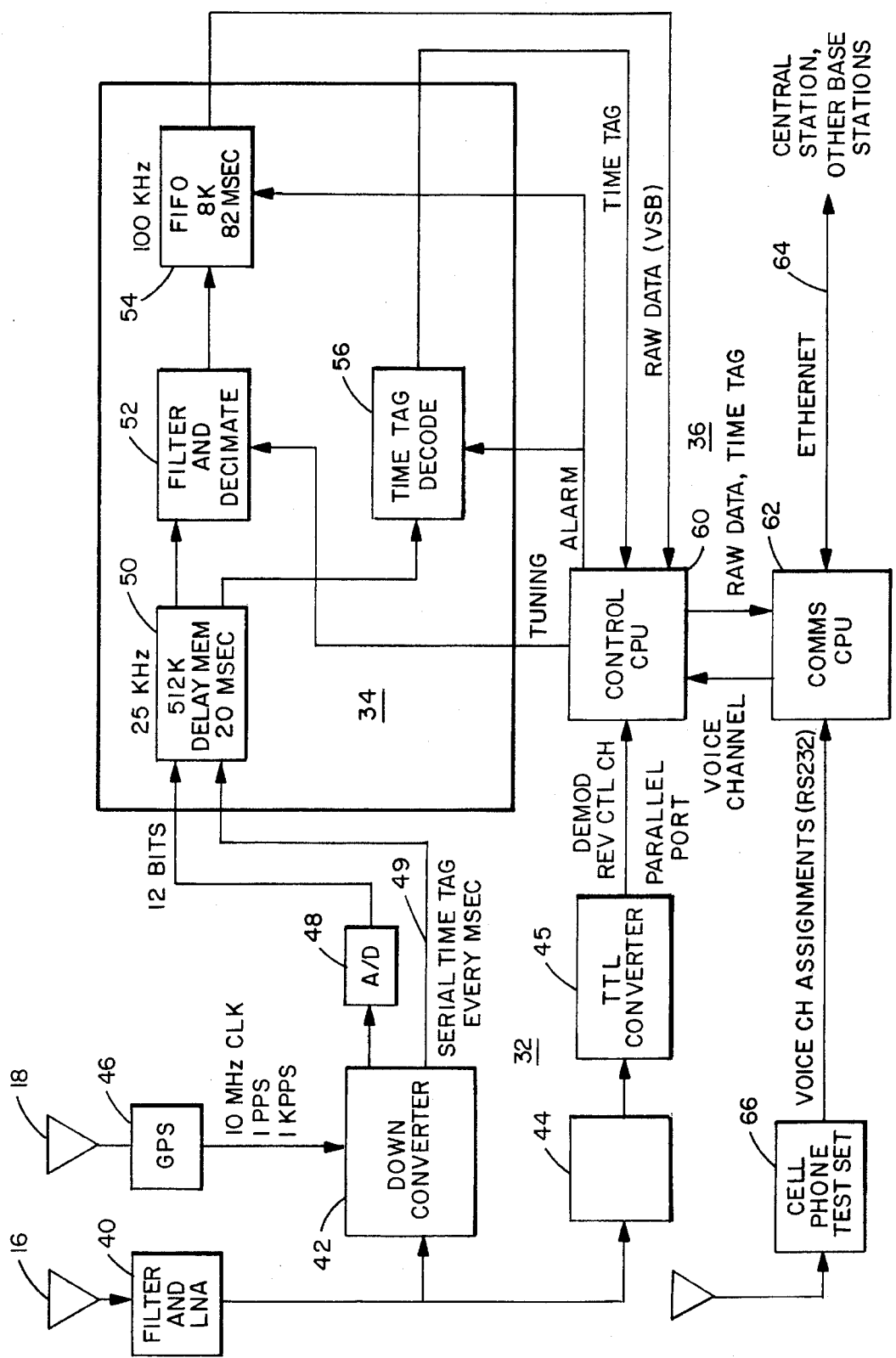
FIG. 2 is a block diagram of one embodiment of a portion of FIG. 1.

FIG. 2 shows a system block diagram for installation at one of the remote base stations 12–14 of FIG. 1. The system 30 shown generally includes a receiver section 32, a processing section 34 and a control and communication section 36. Receiver section 32 is coupled to the existing cell phone antenna 16 and the GPS antenna 18. Signals from the existing cell phone antenna 16 are coupled through a Filter and Low Noise Amplifier 40 to a frequency down converter 42 and a receiver 44 for the reverse control channel of the cell phone system. Down converter 42 outputs signals from the full cell phone bandwidth being received. The analog output of receiver 44 is nominally fed through a TTL converter 45 for providing a digital format to the control section 36.

Down converter 42 also receives demodulated GPS timing signals or time tags at one pulse per second and one kilopulse per second from a GPS receiver 46 connected to GPS antenna 18. Down converter 42 includes a counter (not shown) which is clocked by the kilopulse signal and reset by the pulse per second signal, thus producing a time tag for association with the received cell phone signals. Thus, the GPS time tags, which are substantially the same at all local base stations are used to measure the time of arrival of signals received by antenna 16 on both the reverse control channel and the reverse voice channel. The received cell phone signals from down converter 42 are synchronously fed through an analog-to-digital, A/D, converter 48 to the processing section 34 along with the time tag signals on line 49. Additionally, A/D converter 48 is triggered in response to the GPS signals so that the time tags correspond to the exact points in time that A/D converter 48 performs sampling.

Processing section 34 generally includes a delay memory 50, a filter/decimator 52, a FIFO buffer 54 and a time tag decoder 56. Memory 50 receives digitized data from the cell phone bandwidth being received along with corresponding time tag data. Buffer 54 and decoder 56 output data to a control CPU 60 in control section 36 and receive an alarm or trigger signal therefrom. Filter/decimator 52 receives a tuning signal from CPU 60. The purpose of delay memory 50 is to store data from the cell phone bandwidth while control CPU 60 determines if a portion of that data and its corresponding time tag should be recorded. Because delay memory 50 temporarily stores all data in the cell phone spectrum, it must operate at a fairly high speed such as 25 MHz to cover a cell phone bandwidth of 10 MHz. The purpose of filter/decimator 52 is to digitally tune to only a single channel, 30 KHz, and filter out the remainder of the cell phone spectrum being fed from delay memory 50. Because the data then recorded in FIFO buffer 54 only corresponds to the single channel bandwidth, it can run at a much lower speed, i.e. 100 KHz, than delay memory 50.

Control section 36 includes the control CPU 60 along with a communications CPU 62 which communicate with each other and with the remainder of the locator system 10 using an Ethernet connection 64 over comm. lines 19. Comm. CPU 62 is also coupled to a cell phone receiver 66 of sorts which solely monitors the forward control and voice channels and records voice channel assignments sent from the base station to individual cell phones. In another implementation voice channel assignment data may be hard wired or reported via a direct computer link from the cell phone system thereby making receiver 66 unnecessary.

In operation, comms. CPU 62 receives data over the Ethernet 64 to monitor for a specific predetermined phone number to be located. Cell phone calls to specific telephones number may also be so designated and monitored. Comms. CPU 62 passes this information to control CPU 60 which monitors the reverse control channel signal from receiver 44. Control CPU 60 also sends a tuning signal to filter/decimator 52 so that the data exiting therefrom is the contents of the reverse control channel. Whenever a cell phone places a call, it transmits both its own number and the number to be called over the reverse control channel. Likewise whenever a cell phone is called, its number is transmitted over the forward control channel and it responds over the reverse control channel using its phone number.

Whenever control CPU 60 matches a cell phone transmission number with a predetermined number to be monitored, control CPU 60 generates an alarm or trigger signal for FIFO buffer 54 and time tag decoder 56. This trigger causes buffer 54 to begin collecting data and decoder 56 to identify the specific time tag corresponding to the beginning of the data being so stored. The trigger signal is simultaneously sent to all of the immediately surrounding base stations so that simultaneously transmitted signals are collected. Surrounding base stations will collect data even though the reverse control channel signals they received may not have been strong enough to enable identification of the predetermined cell phone number.

The delay in time between the receipt of a reverse control channel signal and the decoding of that signal by control CPU 60 to generate a trigger in the present embodiment amounts to approximately 20 ms. of data or less. This corresponds to the amount of data stored in delay memory 50 which can therefore be captured in buffer 54 even after the number being monitored has been decoded therefrom. In response to a trigger, buffer 54 collects 82 milliseconds of data which may then be passed as a block or packet to control CPU 62 along with the corresponding decoded initial time tag from decoder 56.

Once a monitored phone is identified from the reverse control channel from receiver 44, the forward control channel is further monitored by comms. CPU 62 and receiver 66 to determine the voice channel assignment from the base station. This assignment is passed to control CPU 60. After the 82 milliseconds of reverse control channel data is collected in buffer 54, control CPU 60 re-tunes filter/decimator 52 to the assigned reverse voice channel and re-triggers buffer 54 and time tag decoder 56 to collect another 82 milliseconds of data from the assigned reverse voice channel. This data is likewise passed with its initial time tag to control CPU 60 and the locator system for processing.

During and after data collection from the reverse voice channel, receiver 66 and comms. CPU 62 also monitor the forward voice channel to detect further voice channel assignments. When such assignments are detected, control CPU 60, as well as surrounding base stations, are notified to change data collection channels. This subsequent reverse voice channel switching both insures that sufficient data is collected for each collection period and also provides additional data for improving the accuracy of the location function performed by tdoa CPU 20.

This process of recording reverse control and voice channel data with its corresponding time tags is performed simultaneously at each of the base stations receiving the cell phone transmission. This may be done in response to identification of the reverse control channel signal at each base station or it may be done in response to trigger signals generated from one or more of the base stations and passed to surrounding base stations via comms. CPU 62 and the Ethernet connection 64. The latter triggering avoids the necessity that each of the base stations receive a signal of sufficient strength from which to identify the predetermined number. The 82 milliseconds of recorded data at each base station provides sufficient identity between the three recorded sets of data to determine comparable times of arrival. Thereafter the recorded data is passed to tdoa CPU 20 where calculations are made to determine relative transmission time to the base stations 12–14 and to apply that data to mapping software. These tdoa calculations are described in greater detail below.

Figure 3:
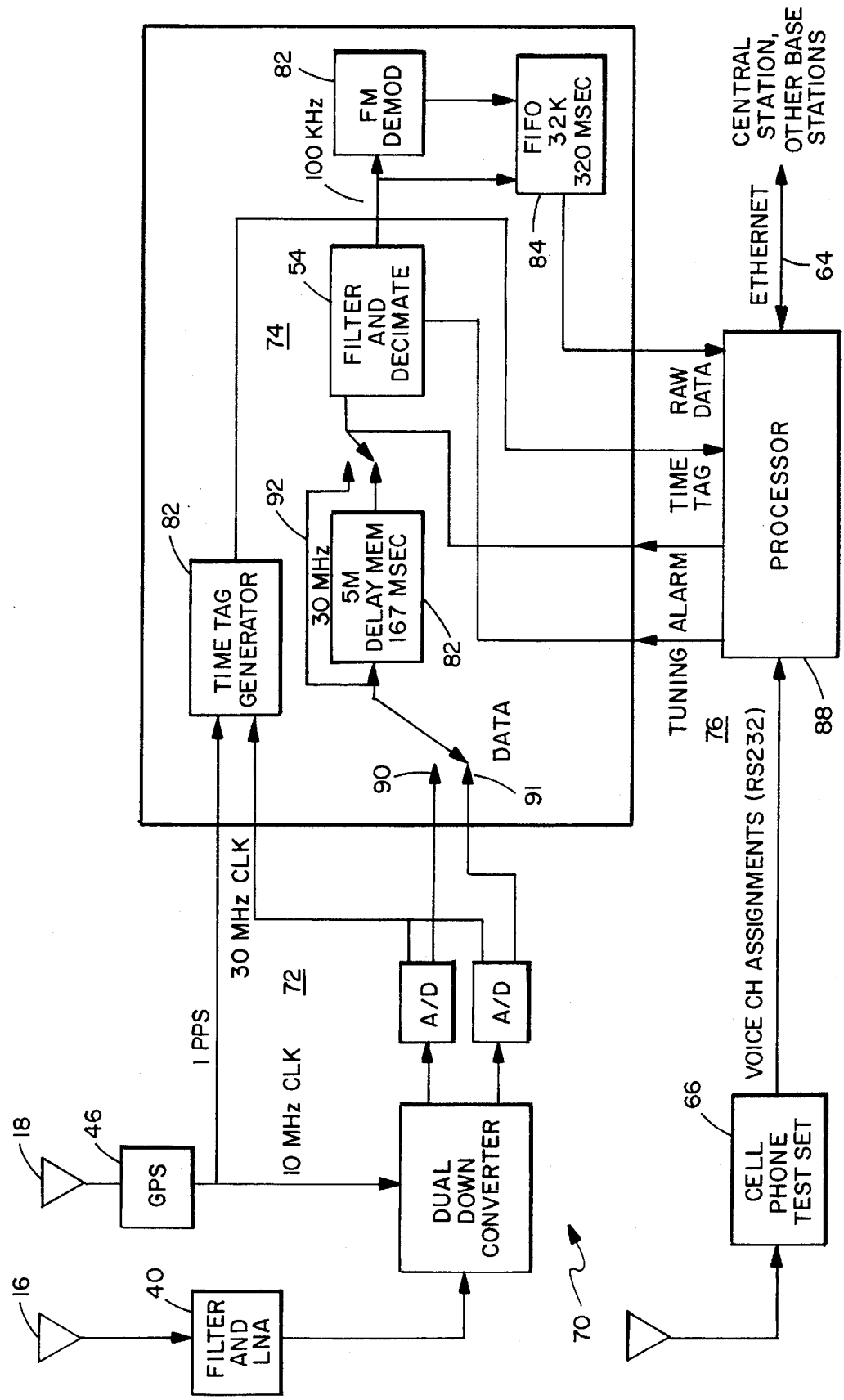
FIG. 3 is a block diagram of a second embodiment of a portion of FIG. 1.

FIG. 3 shows an alternate system embodiment 70 of the base station system 30 of FIG. 2. Sections and components in FIG. 3 bearing the same reference numbers as those in FIG. 2 are identical in form and function. Generally included are a receiver section 72, processing section 74 and control and communication section 76. Receiver section 72 differs from FIG. 2 in that it includes a dual down converter 78 and a pair of A/D converters 80,81. The purpose for this is to cover the entire 25 MHz cell phone spectrum with available A/D converters 80,81 which only operate at 30 MHz. This is accomplished by splitting the cell phone spectrum into a pair of 12.5 MHz. base band signals with the dual down converter 78 and then feeding each base band signal through a separate 30 MHz. A/D 80,81 to provide adequate sampling. To control the A/D converters 80,81 and time tag generation, a 10 MHz. signal from the GPS receiver 46 is converted to a 30 MHz clock signal by the down converter and fed to converters 80,81 and a time tag generator 82 in processor section 74.

Processor section 74 further includes a delay memory 84, a filter/decimator 54, FIFO buffer 84 and an FM demodulator 86. Control and communications section 76 includes a single CPU 88 to perform the functions of both CPUs of FIG. 2. The type of signals passed between processor section 74 and control and comm. section 76 are the same as FIG. 2.

In operation, all of the channels in the wideband cell phone spectrum are received, down converted and digitized in receiver section 72 and fed to processor section 74 as a pair of base band signals 90,91 along with clock and time tag signals synchronized to the digitization process. Processor section 74 receives one of the digitized data signals 90,91, under the control of CPU 88 depending upon the spectrum location of the reverse control channel being monitored. The received signal 90,91 is fed directly into delay memory 82 and into the filter/decimator 54 through a shunt 92 around delay memory 82. Filter/decimator 54 is initially set to separate the reverse control channel and feeds that data to FM demodulator 86, which separates the data contained therein from the carrier signal so that the data can be monitored by CPU 88. This data is passed through a small portion of buffer 84 and fed to CPU 88 for monitoring.

When CPU 88 detects a response from a predetermined cell phone over the demodulated reverse control channel, it generates a trigger which switches the input of filter/decimator 54 from shunt 92 to the output of delay memory 82. Delay memory 82 holds sufficient data so that the predetermined number may be detected by CPU 88 while the same data is still present in delay memory 82. The trigger signal also causes a time tag signal to be sent to CPU 88 to mark the beginning of the data being collected and causes the data output of filter/decimator to be stored in FIFO buffer 84. Once an amount of data (nominally 320 milliseconds) has been collected in buffer 84, it is passed to CPU 88. CPU 88 then re-tunes the filter/decimator to the reverse voice channel assigned to the predetermined cell phone and detected from receiver 66 and also triggers another time tag. This causes data to be collected in buffer 84 from the reverse voice channel. Similar data collections are also made from subsequent reverse voice channel assignments. Once data has been collected and sent to CPU 88, the data is sent with its respective time tags to tdoa CPU 20 for tdoa calculations.

The method and apparatuses which function in accordance with the present invention are robust in that only one of the base stations monitoring the reverse control channel needs to clearly receive a signal from the predetermined cell phone. Because it is possible to simply trigger all surrounding base stations to record and transmit data based upon one or more identified control and voice channels, even signals received by several of the base stations which are too weak for identification can still be used for tdoa measurements. The remote triggering is facilitated by the wideband nature of the data which is received and stored in the delay memory of each base station.

The purpose of analyzing the signal data from each of the base stations is to calculate the tdoa between at least two pairs out of at least three base stations. This tdoa data is then converted to relative distance data and the location of the transmitter can be calculated from the known locations of the base stations and coordinated with map software. For purposes of identification and notation, base stations are referred to as a,b,c and cell phone transmission channels located at different frequencies in the cell phone spectrum are referred to as x,y,z.

The signal data, S(t) for tdoa calculations comes in packets of digitized signals. Each packet, S, corresponds to one transmission channel x,y,z received at one base station, a,b,c as in $S_{ax}$, $S_{ay}$, $S_{az}$, $S_{bx}$ ... Each packet also includes a time tag, nominally for the first sample in the packet, and the sampling frequency or time between samples is known. Two or more channel transmissions are sampled at each base station. Each channel transmission is sampled at three base stations or more.

The first step in the tdoa determination process is the transformation of each packet of data into the frequency domain by performing an FFT to produce S(f) as in $S_{ax}$, $S_{ay}$, $S_{az}$, $S_{bx}$, $S_{by}$, $S_{bz}$ ...

The overall tdoa between any two base stations, $r_{ab}$, is determined by first determining the tdoa function in each separate transmission channel, $R_{abx}$, $R_{aby}$, $R_{abz}$. This is done in the frequency domain by multiplying the signal data received at a base station in a transmission channel, $S_{ax}$, by the complex conjugate of the same channel data received at another base station, $S_{bx}^*$, $$R_{abx}=S_{ax}\times S_{bx}^*$$

The same correlation is performed for each transmission channel, x,y,z, between the two base stations a,b.

Figure 4:
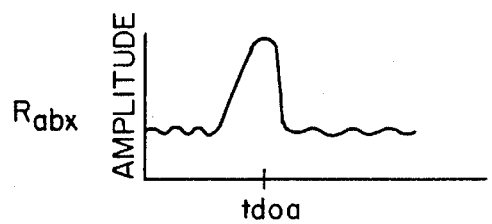
FIG. 4 is a signal diagram of some of the results of the tdoa determination process.
Figure 4:
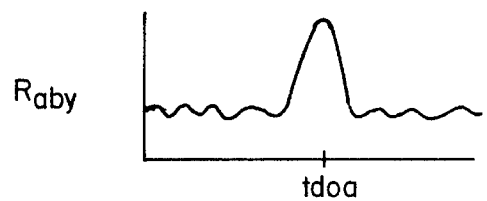
Figure 4:
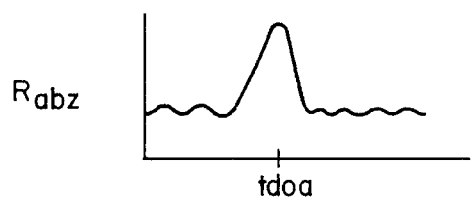

These calculated tdoa functions are converted back into the time domain by an inverse FFT and show an amplitude peak, as seen in FIG. 4, at the tdoa of the two correlated signals. The precise peak is usually not aligned with one of the points produced by the inverse FFT, so a quadratic interpolation is performed using the adjacent points to make a more accurate determination of the peak amplitude and the exact time delay, or tdoa, thereof for each transmission channel.

The tdoa signals plotted in FIG. 4 vary between transmission channels for each pair of base stations because of phase differences at the different frequencies. However, the tdoa amplitudes in the time domain are substantially equal in the absence of substantial multipath signal reception. Thus, variation of the tdoa amplitudes between transmission channels is an indication of multipath problems.

The interpolated time delay or tdoa values for all transmission channels measured between two base stations are averaged to determine Avg.$r_{ab}$.

The average tdoa is subtracted from each of the correlated tdoa functions in the frequency domain by using a multiplication factor to determine a residual phase tdoa, Ph.$R_{abx}$, due to phase in each channel.

Ph.$R_{abx}=R_{abx}\times e^{j2\pi ift}$, where t= Avg.$r_{ab}$, and f is the center frequency of the respective channel, x.

The resulting phase vectors in each of the frequency bins of the residual tdoa function, Ph.$R_{abx}$, Ph.$R_{aby}$, ..., are summed to determine the residual phase tdoa, Ph.$R_{ab}$, for each transmission channel, x,y,z.

Figure 5:
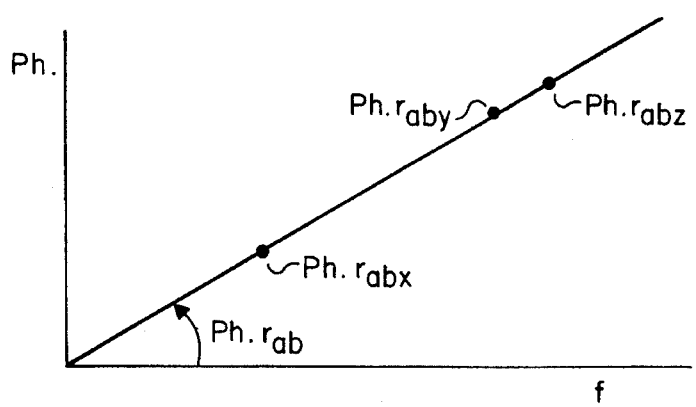
FIG. 5 is a diagram of additional results of the tdoa process.
Figure 6:
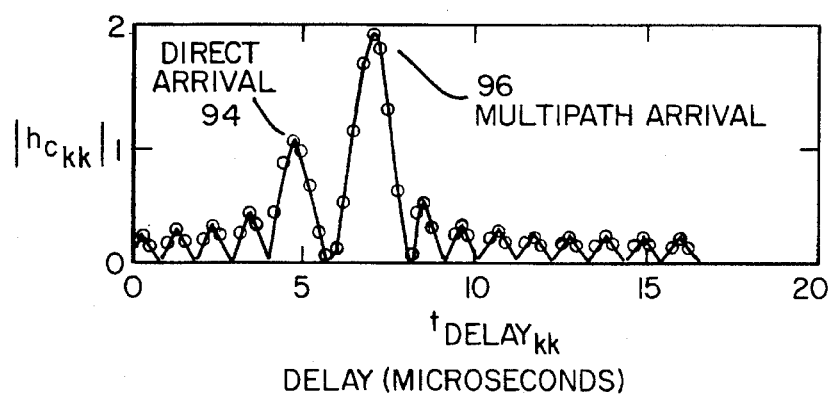
FIG. 6 is another signal diagram of additional results of the tdoa process.

The amplitude of the residual phase tdoas from all of the transmission channels between two base stations are plotted, as shown in FIG. 5, against their respective transmission channel frequencies and the angle of the plot determines the overall residual tdoa, Ph.$r_{ab}$, between two base stations. This residual phase tdoa is added to the average tdoa, Avg.$r_{ab}$, for the respective pair of base stations to determine the overall tdoa, $r_{ab}$, between those stations.

If the plot of phase tdoa vs. frequency of FIG. 5 is not linear or if the peak values of the tdoa functions in the time domain of FIG. 4 are not equal between a pair of base stations, multipath, or multiple signal reception is indicated. In such case, the residual phase tdoa values for each frequency channel, as shown in FIG. 5, are combined with their respective interpolated amplitude values from $R_{abx}$, ... of FIG. 4 and are noted in the frequency domain. All non-sample frequencies are set to a zero amplitude and zero phase. The resulting frequency domain data is converted back into the time domain by an inverse FFT and the resulting time domain data will show the receipt of multiple signals as shown in FIG. 7. The earlier signal 94 is used as the overall residual phase delay, Ph.$r_{ab}$, even though the later signal 96 may be stronger. With a minimum of three transmission channels unevenly spaced within the cell phone band, the earlier arrival may be readily ascertained. Distinguishing the various multipath signals received is also enhanced zero padding in the frequency domain before taking the inverse FFT.

The embodiments described above are intended to be taken in an illustrative and not a limiting sense. Various modifications and changes may be made to the above embodiments by persons skilled in the art without departing from the scope of the present invention as defined in the appended claims.

What is claimed is:

1. A method for determining the time difference of arrival, tdoa, of signals from a cellular telephone, cell phone, at a pair of base stations, comprising the steps of:

substantially simultaneously sampling transmission signals from the cell phone at the pair of base stations in a plurality of cell phone channels having different frequencies;

correlating the corresponding signals sampled at the base stations for each channel to determine a tdoa therebetween for each channel;

averaging the tdoas determined for each channel;

subtracting the average tdoa from each of the determined channel tdoas to determine a residual phase tdoa for each channel;

determining an overall phase tdoa between the pair of base stations based upon the residual phase tdoas for each channel; and adding the average tdoa to the overall phase tdoa to determine an overall tdoa between the pair of base stations.

2. The method of claim 1, wherein the step of correlating produces a tdoa function for each channel and further wherein the step of subtracting the average tdoa from each of the channel tdoas includes multiplication of the correlated tdoa functions for each channel by a factor in the frequency domain and vectorally summing the results thereof to produce a residual phase measurement for each channel.

3. The method of claim 2, wherein the step of determining an overall phase tdoa includes deriving an overall relationship between the residual phase measurements of all channels and their respective channel frequencies.

4. The method of claim 3, wherein the step of deriving an overall relationship includes plotting the residual phase measurements of all channels in the frequency domain against their respective channel frequencies, determining the angle of the plotted phase measurements with respect to the frequency axis, and determining the overall phase tdoa from the determined angle.

5. The method of claim 4, further comprising evaluating the presence of multipath signals from amplitudes of the correlated tdoa functions or from the derived overall relationship between the residual phase measurements of all channels and their respective frequencies.

6. The method of claim 2, wherein the step of determining an overall phase tdoa, comprises the steps of:
   creating a frequency domain function from the residual phase measurements for each channel frequency and respective amplitudes of the correlated tdoa relationships for each channel;
   inverse Fourier transforming the created frequency domain function into a time domain function; and
   choosing the overall phase tdoa from a peak occurrence in the transformed time domain function.

7. The method of claim 6, wherein the step of inverse Fourier transforming results in a time domain function having multiple peaks occurring at sequential points in time representing multiple signal reception, and further wherein the step of choosing the overall phase tdoa includes using a point in time of an earlier occurring peak as the overall phase tdoa.

8. The method of claim 6, wherein the step of creating a frequency domain signal includes setting amplitude and phase values of frequencies outside of the sampled plurality of cell phone channels equal to zero.

9. A method for collecting transmission signals at a first cell phone base station from a particular cell phone for the purpose of determining location of the cell phone using time difference of arrival, tdoa, comprising the steps of:
   receiving signals transmitted over all channels of a wideband, cell phone base station, operating spectrum including a known reverse control channel thereof;
   digitizing the received wideband spectrum signals;
   storing the digitized signals as digitized data in a delay memory;
   monitoring the known reverse control channel signal for a cell phone transmission including a predetermined phone number of a cell phone to be located;
   identifying a predetermined number from the monitoring of the reverse control channel; and
   storing data from the delay memory in response to the identifying of the predetermined number, including the portion of the received signal bearing the identifying data of the predetermined number.

10. The method of claim 9, wherein the steps of receiving signals, digitizing received signals, storing digitized signals, and storing data from the delay memory are performed at a plurality of additional base stations, and further wherein the step of storing data from the delay memory at the plurality of addition base stations is performed in response to the step of identifying a predetermined number performed at the first base station.

11. The method of claim 10, wherein the storing of data from the delay memory includes digitally filtering data stored in the delay memory to retain data from only a single selectable cell phone channel.

12. The method of claim 11, further comprising the steps of generating a sampling signal for the digitizing of the received signals along with corresponding time tag signals for the stored digitized data, and storing the corresponding time tag signals in the delay memory with the digitized data.

13. The method of claim 12, further comprising the steps of determining reverse voice channel assignments and storing data from one or more reverse voice channel assignments by digitally filtering data from the delay memory to retain only digitized reverse voice channel data and its corresponding time tag.

14. An apparatus for collecting transmission signals at a first cell phone base station from a particular cell phone for the purpose of determining location of the cell phone using time difference of arrival, tdoa, comprising:
   means for receiving signals transmitted over all channels of a wideband, cell phone base station, operating spectrum including a known reverse control channel thereof;
   means for digitizing the received wideband spectrum signals;
   means for storing the digitized signals as digitized data in a delay memory;
   means for monitoring the known reverse control channel signal for a cell phone transmission including a predetermined phone number of a cell phone to be located;
   means for identifying the predetermined number from the monitoring of the reverse control channel; and
   means for storing data from the delay memory in response to the identifying of the predetermined number, including the portion of the received signal bearing the identifying data of the predetermined number.

15. The method of claim 14, wherein the means for storing data from the delay memory includes means for digitally filtering data stored in the delay memory for retaining data from only a single selectable cell phone channel.

16. The method of claim 15, further comprising means for generating a sampling signal for the means for digitizing along with corresponding time tag signals for the stored digitized data, and means for storing the corresponding time tag signals in the delay memory with the digitized data.

17. The method of claim 16, further comprising means for determining reverse voice channel assignments and means for enabling the storing of data from one or more reverse voice channels assignments by controlling the means for digitally filtering data from the delay memory to retain only digitized reverse voice channel data and its corresponding time tag.

* * * * *